United States Patent [19]

Murachi

[11] Patent Number: 4,945,016

[45] Date of Patent: Jul. 31, 1990

[54] ADHESIVE COMPOSITION

[75] Inventor: Tatsuya Murachi, Aichi, Japan

[73] Assignee: Toyoda Gosei Co., Ltd., Nishikasugai, Japan

[21] Appl. No.: 300,899

[22] Filed: Jan. 24, 1989

[30] Foreign Application Priority Data

Mar. 25, 1988 [JP] Japan .................................. 63-72417
Apr. 14, 1988 [JP] Japan .................................. 63-92246
Apr. 27, 1988 [JP] Japan .................................. 63-104897

[51] Int. Cl.$^5$ ...................... C09G 18/42; C09G 18/48; C09J 175/06; C09J 175/08
[52] U.S. Cl. ........................................ 524/81; 524/94; 524/101; 524/104; 524/106; 524/401; 524/410; 524/411; 524/420; 524/462; 524/464; 524/590; 525/453; 525/460; 252/182.2
[58] Field of Search .................. 524/81, 94, 101, 104, 524/106, 401, 410, 411, 420, 462, 464, 590; 525/453, 460; 252/182.2

[56] References Cited

U.S. PATENT DOCUMENTS

| | | | |
|---|---|---|---|
| 3,880,808 | 4/1975 | Hausch et al. | 525/453 |
| 4,748,212 | 5/1988 | Murachi et al. | 525/359.2 |
| 4,849,468 | 7/1989 | Murachi et al. | 524/405 |

Primary Examiner—Maurice J. Welsh
Assistant Examiner—Rabon Sergent
Attorney, Agent, or Firm—Cushman, Darby & Cushman

[57] ABSTRACT

The present invention relates to an adhesive composition comprising 100 parts by weight of a polyester-polyurethane having an isocyanate group (—NCO) and 0.002-20 parts by weight of a halogenating agent, suitably used for the adhesion of polyolefin materials which are difficult to glue, such as car molding and base materials for electrostatic flocked products, the adhesion of trimming, the adhesion of rubber products and others.

6 Claims, No Drawings

ADHESIVE COMPOSITION

BACKGROUND OF THE INVENTION

1. Field of the Invention

The present invention relates to adhesive compositions to be utilized for the adhesion of polyolefin materials which are used in automotive parts and which adhere with other materials with difficulty, the adhesion of materials for electrostatic flocked products, and the adhesion and coating of products made of rubber or synthetic resin.

2. Description of the Related Art

As the usual methods of adhesion of polyolefin materials such as polypropylene and others, which adhere with other materials with difficulty, there is a method of applying an adhesive subsequent to performing a surface treatment with primers such as chloroprene rubbers and others, and a method of applying an adhesive after treatment by corona discharge.

Also, previously, a resin coating such as nylon, epoxy, acrylic, acrylic ethylene copolymers and others, or a rubber coating such as butadiene rubber (BR), chloroprene rubber (CR), and styrene-butadiene copolymer rubber (SBR) and others, is the usual material used in surface coating such as natural rubber (NR) and synthetic rubbers such as styrene-butadiene copolymer rubber (SBR), butadiene rubber (BR), isobutylene-isoprene copolymer rubber (IIR), chloroprene rubber (CR), acrylonitrile-butadiene copolymer rubber (NBR), isoprene rubber (IR), ethylene-propylene-diene terpolymer rubber (EPDM), and ethylene-propylene copolymer rubber (EPM), fibers such as cotton and rayon, and synthetic resins such as acrylonitrile-butadiene-styrene terpolymer (ABS) and polystyrene (PS).

Also, as a means for improving the endurance to abrasion of the weather strip of automobiles, there is a method of providing on its surface, a film of chloroprene rubber by applying a urethane coating containing chloroprene rubber, or providing a film of silicon coating.

Further, the side protection molding furnished on the sides of the car body are attached by means of an adhesive tape that is adhesive on both of its surfaces. A wax is applied on the car body to preserve the coating. In order to remove this wax, the car has to be washed using a wax remover. Also, when fuel, such as gasoline, is being supplied to the fuel tank of the automobile, there is the possibility that the fuel may spill.

In the methods of adhesion mentioned above, since previous treatment with a primer or by corona discharge is required for the adhesion of polyolefin materials, there is an increase in the number of the required processes, resulting in poor operating efficiency, aside from the fact that the adhesive strength acquired with these methods is low.

Also, prior to the present invention, there has been the problems of poor adhesion of the resin coating and the rubber coating with the material to be adhered, and, moreover, the problem of the deterioration of the endurance to abrasion of the coat thus formed.

Further, in the methods where a film of chloroprene rubber or a silicon coating is applied on the weather strip of a car, there is still the problem of the deterioration of the endurance to abrasion.

Finally, in the case where the car is washed using a wax remover, or when fuel is split on the car body as mentioned earlier, there is the problem of the deterioration of the strength of the adhesion between the tape having two adhesive surfaces and the car body, or between the tape and the molding, when the wax remover or the split fuel is absorbed by the adhesive tape.

SUMMARY OF THE INVENTION

An object of the present invention is to provide a solution to the problems related to the prior art mentioned above, by providing an adhesive composition that has strong adhesive properties, and, without the need for a prior treatment, enables the adhesion of polyolefin materials which adheres with other materials with difficulty.

One other object of the present invention is to solve the problems mentioned above, by providing an adhesive composition that provides a coating with excellent endurance to abrasion, and has a strong adhesion with the coated material.

In order to realize the objects mentioned above, the adhesive composition of the present invention has a constitution comprising 100 parts by weight of a polyester-polyurethane that has an isocyanate group (—NCO) and 0.002–20 parts by weight of a halogenating agent.

Also, the adhesive composition of the present invention has a constitution comprising 100 parts by weight of a polyurethane containing a hydroxyl group (—OH) or an isocyanate group (—NCO) formed by the reaction of a low molecular-weight diol with the product of the reaction of a diisocyanate with a mixture of polyester diol and polyether diol, and 0.002–20 parts by weight of a halogenating agent.

The specific nature of the invention, as well as other objects, uses and advantages thereof, will become clear with an understanding of the described embodiments and the appended claims. Also, many other advantages not mentioned in this specification will become apparent to one skilled in the art upon application of the present invention.

DETAILED DESCRIPTION OF THE PREFERRED EMBODIMENTS

First, the constitution of the adhesive composition related to the first aspect of the invention is explained in detail.

Polyester-polyurethane comprises a polyisocyanate and a polyester polyol. A polyisocyanate is a compound containing a plurality of isocyanate groups, for example, there are the aromatic polyisocyanates such as tolylene diisocyanate (TDI), 1,5-naphthalene diisocynate (NDI), xylilene diisocyanate (XDI), 4,4'-diphenylmethane diisocyanate (MDI), 4,4',4''-triphenylmethane triisocyanate (TPMI), isophorone diisocyanate (IPDI) and others, the alicyclic polyisocyanates such as 4,4'-methylenebis (cyclohexyl isocyanate) (H-MDI), hexahydroxylilene diisocyanate and others, and the aliphatic polyisocyanates such as 1,6-hexamethylene diisocyanate (1,6-HMDI) and others.

As examples of a polyester polyol, there are polybutylene adipate (PBA), polyethylene butylene adipate (PEBA), polyethylene adipate (PEA), polyethylene sebacate (PESe) and others.

As a halogenating agent, for example, there are alkyl hypohalides such as t-butyl hypochloride (t-BHC), hypohalogenous acids such as sodium hypochlorite and potassium hypochlorite, compounds that have a -CONX-bond in a molecule such as N-bromosuccinimide (NSBI), trichloroisocyanuric acid (TCIA), dichloroisocyanuric acid (DiCIA) and others, and a mixed solution comprising antimony pentafluoride, sulfur fluoride and bromine. Among the halogenating agents mentioned above, alkyl hypohalide, hypohalogenous acid or the compound having a -CONX-bond in a molecule is preferred.

The mixing ratio of the halogenating agent is in the range of 0.002-20 parts by weight to 100 parts by weight of polyester-polyurethane. When the mixing ratio is less than 0.002 part by weight, the degree of halogenization is low, resulting in a small improvement in the adhesive strength, whereas when the mixing ratio is more than 20 parts by weight, the stability of the adhesive composition is impaired.

Solvents and chain extending agents may be used as desired. As chain extending agents, the examples are dihydric alcohols such as butylene glycol (BG), 1,6-hexanediol (1,6-HD), ethylene glycol (EG) and others.

As solvents, there are aliphatic hydrocarbons such as n-hexane, n-heptane and n-octane, alicyclic hydrocarbons such as cyclohexane and cyclooctane, aromatic hydrocarbons such as benzene, ethyl benzene, toluene and xylene, ketones such as acetone, methyl ethyl ketone, ethyl propyl ketone and methyl butyl ketone, ethers such as tetrahydrofuran, acetic esters such as methyl acetate, ethyl acetate, and isopropyl acetate, halogenated hydrocarbons such as methylene chloride, 1,1,1-trichloroethane and trichloroethylene, and aside from the above, there are dimethyl sulfoxide (DMSO), dimethyl formamide (DMF) and others. These solvents can be used alone or as a mixed solution of two or more kinds of the above solvents, the mixing ratio of the adhesive composition with these solvents being determined accordingly and appropriately.

Next, the constitution of the adhesive composition related to the second aspect of the invention is described.

As a polyester diol used in the present invention, there are substances synthesized by the reaction of a type of diol, or a mixture of two or more types of diols, such as EG as mentioned earlier, propylene glycol, 1,4-butanediol, 1,3-butanediol, 2,3-butanediol, diethylene glycol, dipropylene glycol, triethylene glycol, 1,5-pentanediol, 1,6-HD mentioned earlier, neopentyl glycol and others, and a type of carbonic acid, or a mixture of two or more types of carbonic acids, such as succinic acid, adipic acid, azelaic acid, sebacic acid, phthalic acid and isophthalic acid and others.

As a polyether diol, polyoxypropylene glycol (PPG), polyoxyethylene glycol, polytetramethylene oxide glycol and others are used.

These polyester diols and polyether diols are used in the form of mixtures. The mixing ratio can be set appropriately over a wide range of ratios of the polyester diol and polyether diol.

Among the substances used as a diisocyanate, there are 2,4-tolylene diisocyanate, 65/35 (the ratio of 2,4-tolylene diisocyanate to 2,6-tolylene diisocyanate, the same hereinafter) tolylene diisocyanate, 80/20 tolylene diisocyanate, MDI mentioned earlier, dianisidine diisocyanate, tolidene diisocyanate, hexamethylene diisocyanate, metaxylene diisocyanate, 1,5-naphthalene diisocyanate, hydrogenated diphenylmethane diisocyanate, hydrogenated xylene diisocyanate, hydrogenated 2,4-tolylene diisocyanate, hydrogenated 65/35 tolylene diisocyanate, hydrogenated 80/20 tolylene diisocyanate, isophorone diisocyanate and others.

The diisocyanate is made to react with a mixture of a polyester diol and a polyether diol mentioned earlier. In this reaction, an appropriate ratio of the mixture and the diisocyanate mentioned above in terms of hydroxyl group (—OH):isocyanate group (—NCO) is a mole ratio in the range of 1:2-10. When the proportion of the —NCO is less than 2, the polyurethane generated by the reaction becomes too soft, becoming not suitable for use as a coating. Also, when the proportion of the —NCO is more than 10, the polyurethane becomes too hard and brittle, and neither is it suitable for use as a coating.

As a low molecular-weight diol, there are substances which can be used alone, or as a mixture of two or more types, such as EG, propylene glycol, 1,4-butanediol, 1,3-butanediol, 2,3-butanediol, diethylene glycol, dipropylene glycol, triethylene glycol, 1,5-pentanediol, 1,6-HD, neopentyl glycol, and others.

This low molecular-weight diol is added to the product generated by the reaction of the mixture of polyester diol and polyether diol with a diisocyanate. As the proportion of this low molecular-weight diol becomes high, the proportion of —OH becomes high compared to the proportion of —NCO, generating a polyurethane of terminal —OH. On the other hand, when the proportion of the low molecular-weight diol is small, the proportion of —NCO becomes relatively high compared to the proportion of —OH, and a polyurethane of terminal —NCO is generated. In the present invention, as any of the substances generated can be used, one may be chosen appropriately according to usage.

As mentioned above, the polyurethane having an isocyanate group or a hydroxyl group is generated by first making a mixture of polyester diol and polyether diol react with a diisocyanate, then making the product of this reaction further react with the low molecular-weight diol.

In this process, a solvent may be used as desired. Among the solvents that can be used are n-hexane, cyclohexane, benzene, toluene, xylene, ethyl benzene, acetone, methyl ethyl ketone, methyl isopropyl ketone, methyl isobutyl ketone, tetrahydrofuran, methyl acetate, ethyl acetate, isopropyl acetate, isobutyl acetate, methylene chloride, 1,1,1-trichloroethane, DMSO mentioned earlier, DMF and others.

As a halogenating agent, the ones in use are acid imido halogen compounds such as NBSI mentioned earlier, N-bromophthalimide and others, isocyanuric acid halides such as TCIA, DiCIA and others, halogenized hydantoins such as dichlorodimethyl hydantoin, and alkyl hypohalides and others.

The alkyl hypohalide mentioned above is a normal, secondary or tertiary alkyl hypohalide, the preferred ones being a chloride and a bromide of a particularly stable tertiary alkyl hypohalide, that is, the t-BHC mentioned earlier, tertiary butyl hypobromide, tertiary amyl hypobromide and others. Aside from these, halogen substituted alkyl hypochlorides such as dichloro-, trichloro-, fluoromethyl hypochloride or others can also be used.

The mixing ratio of the halogenating agent and its grounds are the same as those of the first case of the invention.

EMBODIMENTS 1 TO 5 AND COMPARATIVE EXAMPLES 1 AND 2

Embodiments using the adhesive composition of the first aspect of the present invention is described below and compared with comparative examples.

First, a polyester-polyurethane having an isocyanate group was synthesized according to the mixing ratio described below.

Polyester-polyurethane [1]

A polyurethane prepolymer was synthesized by mixing 100 parts by weight (hereinafter referred to as parts only) of MDI with 66.56 parts of PBA (average molecular weight 500) in trichloroethylene and making them undergo reaction for three hours in a dry nitrogen gas atmosphere at a temperature of 80° C. Afterward, polyester-polyurethane was synthesized by adding 20.40 parts of BG to this polyurethane prepolymer and making them undergo reaction for 20 minutes at a temperature of 80° C. The polyester-polyurethane obtained was 25% solid and 75% trichloroethylene.

Polyester-polyurethane [2]

A polyurethane prepolymer was synthesized by mixing 100 parts of MDI with 266.31 parts of PEBA (average molecular weight 2000) in trichloroethylene and making them undergo reaction for three hours in a dry nitrogen gas atmosphere at a temperature of 80° C. Afterward, polyester-polyurethane was synthesized by adding 26.76 parts of 1,6-HD to this polyurethane prepolymer and making them undergo the reaction for 20 minutes at a temperature of 80° C. The polyester-polyurethane obtained was 25% solid and 75% trichloroethylene.

Polyester-polyurethane [3]

A polyurethane prepolymer was synthesized by mixing 100 parts of XDI with 191.94 parts of PEA (average molecular weight 1000) in trichloroethylene and making them undergo reaction for three hours in a dry nitrogen gas atmosphere at a temperature of 80° C. Then, polyester-polyurethane was synthesized by adding 44.09 parts of EG to this polyurethane prepolymer and making them undergo reaction for 20 minutes at a temperature of 80° C. The polyester-polyurethane obtained was 25% solid and 75% trichloroethylene.

Polyester-polyurethane [4]

A polyurethane prepolymer was synthesized by mixing 100 parts of 1,6-HMDI with 99.10 parts of PESe (average molecular weight 1000) in trichloroethylene and making them undergo reaction for three hours in a dry nitrogen gas atmosphere at a temperature of 80° C. Afterward, polyester-polyurethane was synthesized by adding 28.92 parts of EG to this polyurethane prepolymer and making them undergo reaction for 20 minutes at a temperature of 80° C. The polyester-polyurethane obtained was 25% solid and 75% trichloroethylene.

Polyester-polyurethane [5]

A polyurethane prepolymer was synthesized by mixing 100 parts of MDI with 266.31 parts of PEA (average molecular weight 1000) in trichloroethylene and making them undergo reaction for three hours in a dry nitrogen gas atmosphere at a temperature of 80° C. Afterward, polyester-polyurethane was synthesized by adding 5.79 parts of EG to this polyurethane prepolymer and making them undergo reaction for 20 minutes at a temperature of 80° C. The polyester-polyurethane obtained was 25% solid and 75% trichloroethylene.

Next, using adhesive compositions combining 100 parts of the solid portions of the polyurethanes [1]–[5] obtained above and a halogenating agent at the mixing ratios shown in Table 1, the adhesive strengths of these adhesive compositions were measured using a five-times magnification polyethylene foam as the material to be glued.

In the adhesive strength measurement, two pieces of five-times magnification polyethylene foams, serving as test pieces, were applied with the adhesive composition on an adhesion area of $25 \times 25$ mm, heated for two minutes at a temperature of 100° C. to let the solvent evaporate, then glued and formed together under a load of 5 kg/cm$^2$. The tensile shear strength (kg/cm$^2$) was measured by a tension test of the test piece thus prepared, at a pulling speed of 50 mm/min. The results are shown in Table 1.

TABLE 1

| Embodiment or Comparative Example | Polyester-Polyurethane | Halogenating Agent | Tensile Shear Strength |
|---|---|---|---|
| Embodiment 1 | [1] (100) | t-BHC (0.002) | 6.1* |
| Embodiment 2 | [2] (100) | t-BHC (1) | 5.9* |
| Embodiment 3 | [3] (100) | NBSI (1) | 6.1* |
| Embodiment 4 | [4] (100) | TCIA (1) | 6.0* |
| Embodiment 5 | [5] (100) | TCIA (20) | 5.8* |
| Comparative Example 1 | [1] (100) | TCIA (30) | Gelled |
| Comparative Example 2 | [1] (100) | TCIA (0.001) | 0.2 |

The abbreviations in the table stand for the following:
t-BHC: t-butyl hypochloride
NBSI: N-bromosuccinimide
TCIA: trichloroisocyanuric acid
[1] to [5] under the column polyester-polyurethane correspond to the polyester-polyurethanes [1] to [5] which are polyurethanes that contain an isocyanate group, as mentioned earlier, and the symbol "*" under the column tensile shear strength denotes the collapse of the polyethylene foam used as the test piece.

As shown in Table 1, with the mixing proportion of the halogenating agent with the polyester-polyurethane containing an isocyanate group in the range of 0.002–20 parts, it is observed that the five-times magnification polyethylene foam used as the test piece collapses at a higher tensile shear strength.

That the adhesive composition of the present invention exhibits such a superior adhesive strength is due to the fact that the halogen in the halogenating agent halogenizes the non-polarized polyolefin in the test piece, as well as halogenizes the polyurethane in the adhesive composition, resulting in a strengthening of the intermolecular forces.

On the other hand, as shown in Comparative Examples 1 and 2, it can be observed that when the mixing proportion of the halogenating agent is not within the range prescribed in the present invention, either the stability of the adhesive composition is poor or the adhesive strength is very weak.

Thus, in this embodiment, not only is the adhesion of difficult to adhere polyethylene materials easily accomplished without the use of any primers as in the prior methods, but, moreover, the adhesive strength obtained is very high. Therefore, the adhesive composition of the present invention can be suitably used, for example, for products using polyolefin materials such as car molding, base material for electrostatic flocked products, interior trims, rubber products and others.

EMBODIMENTS 6 TO 11 AND COMPARATIVE EXAMPLES 3 TO 12

An embodiment of the second aspect of the invention applied as a coating composition is described below and compared with comparative examples.

First, the material to be coated is a vulcanized material as described in the following.

The vulcanized material is obtained by vulcanizing a composition of 100 parts of EPDM, 70 parts of carbon black, 35 part of mineral oil, 7 parts of zinc oxide, 2 parts of stearic acid, 2 parts of a vulcanizing accelerator and 1.5 parts of sulfur for 30 minutes at a temperature of 160° C.

Also, an abrasion endurance test is performed according to the method and conditions described below, with the evaluation of the endurance to abrasion being measured in terms of the amount of abrasion.

Abrasive Wheel: H-22, load: 1 kg
Abrasion Speed of Rotation: 60 rpm
Test Area: 100 mm × 100 mm
Abrasion Cycle: 1000 cycles

EMBODIMENT 6

A mixture of 120 parts of PPG (molecular weight about 2000), 44 parts of polyethylene adipate (molecular weight about 2000), 100 parts of MDI and 264 parts of trichloroethylene was heated for three hours in an atmospheric current of dry nitrogen at a temperature of 80° C.

Further, 24.8 parts of 1,6-hexanediol and 170 parts of DMF were added and then heated for 20 minutes in an atmospheric current of dry nitrogen at a temperature of 80° C. Polyurethane was obtained as a result of these processes.

A coating composition was then obtained by mixing 30 parts of carbon black, 100 parts of toluene, 40 parts of DMF and 0.002 part of TCIA to 100 parts of the polyurethane obtained above.

This coating composition was applied on the material to be coated mentioned earlier and hardened by heating for 2 minutes at a temperature of 100° C. to produce a test material. Then the abrasion endurance test mentioned earlier was performed on this test material. The result of this test is shown in Table 2.

EMBODIMENT 7

A coating composition was obtained by mixing 10 parts of carbon black, 80 parts of toluene, 50 parts of DMF and 0.4 part of NBSI to 100 parts of a polyurethane prepared in the same manner as in Embodiment 6.

This coating composition was applied on the material to be coated mentioned above and hardened by heating for 5 minutes at a temperature of 100° C. to produce a test material. Then the abrasion endurance test mentioned above was performed on this test material. The result of this test is shown in Table 2.

EMBODIMENT 8

140 parts of PPG (molecular weight about 2000), 60 parts of polyethylene adipate (molecular weight about 2000), 100 parts of MDI and 300 parts of trichloroethylene were made to undergo reaction according to the same method used for Embodiment 6. After this, polyurethane was synthesized by adding 24.2 parts of 1,6-HD and 246 parts of DMF and making the mixture undergo reaction in the same manner as in Embodiment 6.

A coating composition was prepared by mixing 30 parts of carbon black, 100 parts of benzene, 50 parts of DMF and 0.1 part of TCIA to 100 parts of this polyurethane.

This coating composition was applied on the material to be coated mentioned above and hardened by heating for 5 minutes at a temperature of 100° C. to produce a test material. Then the abrasive endurance test mentioned above was performed on this test material. The result of this test is shown in Table 2.

EMBODIMENT 9

Polyurethane was obtained by mixing 60 parts of PPG (molecular weight about 2000), 140 parts of PEBA (molecular weight about 2000), 100 parts of MDI and 300 parts of trichloroethylene and then letting the mixture undergo reaction according to the same method used for Embodiment 6.

A coating composition was prepared by mixing 189 parts of 1,4-butanediol, 246 parts of DMF and 10 parts of TCIA to 100 parts of this polyurethane.

Using this coating composition, a test material was produced in the same manner as in Embodiment 8 mentioned above. The abrasion endurance test mentioned above was performed on this test material. The result of this test is shown in Table 2.

EMBODIMENT 10

Polyurethane was obtained by mixing 60 parts of PPG (molecular weight about 2000), 140 parts of PBA (molecular weight about 2000), 100 parts of MDI and 300 parts of trichloroethylene and then letting this mixture undergo reaction according to the same method used for Embodiment 6.

A coating composition was prepared by mixing 12.2 parts of ethylene glycol, 300 parts of DMF and 20 parts of TCIA to 100 parts of this polyurethane.

Using this coating composition, a test material was produced in the same manner as in Embodiment 6 mentioned above. Then, the abrasion endurance test mentioned earlier was performed on this test material. The result of this test is shown in Table 2.

EMBODIMENT 11

Polyurethane was obtained by mixing 140 parts of PPG (molecular weight about 2000), 60 parts of PEBA (molecular weight about 2000), 100 parts of MDI and 300 parts of trichloroethylene and letting this mixture undergo reaction as in Embodiment 6 mentioned earlier.

A coating composition was prepared by mixing 12.2 parts of ethylene glycol, 300 parts of DMF and 10 parts of TCIA to 100 parts of this polyurethane.

Using this coating composition, a test material was produced in the same manner as in Embodiment 6 mentioned earlier. The abrasion endurance test was then performed on this test material. The result of this test is shown in Table 2.

COMPARATIVE EXAMPLE 3

A coating was prepared by mixing 100 parts of liquid polybutadiene (a product of Idemitsu Sekiyu Kagaku Kogyo Kabushikigaisha with the brand name Idemitsu Seal AB-700W) and 10 parts of MDI. This coating was applied on the material to be coated and then hardened at room temperature to produce a test material. The abrasion endurance test was performed on this test material and the result of this test is shown in Table 2.

COMPARATIVE EXAMPLE 4

A coating was prepared by mixing 100 parts of liquid polybutadiene (a product of Idemitsu Sekiyu Kagaku Kogyo kabushikigaisha with the brand name Idemitsu Seal AB-100) and 10 parts of MDI. This coating was applied on the material to be coated and hardened at room temperature to produce a test material. The abrasion endurance test was then performed on this test material. The result of this test is shown in Table 2.

COMPARATIVE EXAMPLE 5

A 70% solution of N-metoxymethylized nylon (a product of Teikoku Kagaku Sangyo Kabushikigaisha with the brand name Trejin M-20) was applied on the material to be coated and made to harden at room temperature to produce a test material. The abrasion endurance test was performed on this test material. The result of this test is shown in Table 2.

COMPARATIVE EXAMPLE 6

A coating was prepared by mixing 100 parts of epoxy resin (a product of Nippon Ciba-Geigy Kabushikigaisha with the brand name Alardite PZ820) and 100 parts of polyaminoamide (a product of Nippon Ciba-Geigy Kabushikigaisha with the brand name Hardener HZ). This coating was applied on the material to be coated and made to harden at room temperature to produce a test material. The abrasion endurance test was performed on this test material. The result of this test is shown in Table 2.

COMPARATIVE EXPERIMENT 7

A coating was prepared by mixing 100 parts of epoxy resin (a product of Nippon Ciba-Geigy Kabushikigaisha with the brand name Alardite GY250) and 30 parts of polyaminoamide (a product of Nippon Ciba-Geigy Kabushikigaisha with the brand name Hardener HZ). This coating was applied on the material to be coated and made to harden at room temperature to produce a test material. The abrasion endurance test was performed on this test material and the result of this test is shown in Table 2.

COMPARATIVE EXPERIMENT 8

As a coating, a solution containing 74% toluene of a chloroprene rubber (a product of Konishi Kabushikigaisha with the brand name Bond $G_2$) was applied on the material to be coated and then made to harden at room temperature to produce a test material. The abrasion endurance test was performed on this material. The result of this test is shown in Table 2.

COMPARATIVE EXAMPLE 9

SBR (a product of Nogawa Chemical Kabushikigaisha with the brand name Diabond 5010) was applied on the material to be coated and made to harden at room temperature to produce a test material. The abrasion endurance test was performed on this material. The result of this test is shown in Table 2.

COMPARATIVE EXAMPLE 10

As a coating, a 70% non-volatile acrylic resin emulsion (a product of Nogawa Chemical Kabushikigaisha with the brand name Diabond DA--830A) was applied on the material to be coated and made to harden at room temperature to produce a test material. The abrasion endurance test was performed on this test material. The result of this test is shown in Table 2.

COMPARATIVE EXAMPLE 11

As a coating, a 55% non-volatile denatured acrylic ethylene emulsion (a product of Sunstar Kagaku Kabushikigaisha with the brand name Penguin Cement 138) was applied on the material to be coated and made to harden at room temperature to produce a test material. The result of this test is shown in Table 2.

COMPARATIVE EXAMPLE 12

As a coating, a polyurethane coating (a product of Nogawa Chemical Kabushikigaisha with the brand name Diabond DA700E) was applied on the material to be coated and made to harden at room temperature to produce a test material. The abrasion endurance test was performed on this test material. The result of this test is shown in Table 2.

TABLE 2

| Embodiment or Comparative Example | Amount of Abrasion (mg/1000 cycles) |
| --- | --- |
| Embodiment 6 | 25 |
| Embodiment 7 | 28 |
| Embodiment 8 | 20 |
| Embodiment 9 | 10 |
| Embodiment 10 | 9 |
| Embodiment 11 | 11 |
| Comparative Example 3 | 2252 |
| Comparative Example 4 | 2290 |
| Comparative Example 5 | 631 |
| Comparative Example 6 | 692 |
| Comparative Example 7 | 572 |
| Comparative Example 8 | 691 |
| Comparative Example 9 | 1950 |
| Comparative Example 10 | 671 |
| Comparative Example 11 | 624 |
| Comparative Example 12 | 482 |

As shown in Table 2, in the abrasion tests at 1000 cycles of the abrasion wheel, the amounts of abrasion of the test materials applied with the coating of each of the comparative examples are all greater than or equal to 482 mg. On the other hand, the amounts of abrasion of the test materials applied with the coating compositions of the present invention are all less than or equal to 28 mg, very much smaller than those of the comparative examples, thus showing that the coating compositions of the present invention have good endurance to abrasion. This is due to the combined usage of polyester diol and polyether diol and, moreover, to the hardness and other properties of the polyurethane having an increased molecular weight, which was obtained as a result of the reaction with a low molecular-weight polyol as a chain extending agent.

Also, for the coating compositions of Embodiments 6 to 11, the acquired coating exhibited good adhesion with the material to be coated. This is due to the fact that the halogenating agent halogenates the coating composition itself, as well as halogenating the material to be coated, thus improving their mutual binding forces.

EMBODIMENTS 12 TO 17 AND COMPARATIVE EXAMPLES 13 AND 14

An embodiment of the coating composition of the second aspect of the present invention for use in weather strips of cars is described below.

The base material normally used for weather strips is a vulcanized polyolefin rubber. Specific examples are EPDM, EPM and others. Further, these polyolefin rubbers can be used with a mixture of other rubber materials, as long as the mixing proportion of these other materials is within a range in which the properties of these polyolefin rubbers are not lost. For example, for the vulcanized polyolefin rubber, the mixing proportion of the other rubber material must be less than or equal to ½ parts by weight of the vulcanized polyolefin rubber. Examples of these other rubber materials are NR, SBR, NBR, IR, CR, IIR, all mentioned earlier, and others.

Depending on the object, the various vulcanized rubbers mentioned above can be mixed with other mixing substances that are normally used, such as vulcanizing agents, vulcanizing accelerators, age resisters, antioxidants, antiozonants, fillers, plasticizers, foaming agents, auxiliary foaming agents and others.

Examples of vulcanizing agents are sulfur, morpholinedisulfide, dicumyl peroxide and others.

As examples of vulcanizing accelerators, there are 2-mercaptobenzothiazole, zinc dimethyl dithiocarbamate, tetramethylthiuram disulfide and others.

As examples of age resisters, antioxidants and antiozonants, there are phenyl-α-naphthylamine, 2,6-di-t-butyl-p-cresol and others.

As examples of fillers, there are carbon black, hydrosilicate, magnesium carbonate, clay and others.

As examples of plasticizers, there are dioctyl sebacate, mineral oil and others.

As foaming agents, there are N,N'-dinitrosopentamethylene tetramine, N,N'-dimethyl-N,N'-dinitrosotelephthalamide, azodicarbonamide, azobisisobutyronitrile, benzene sulfonyl hydrazide, p,p'-oxybis (benzene sulfonyl hydrazide), toluene sulfonyl hydrazide and others.

As examples of auxiliary foaming agents, there are urea, salicylic acid and others.

After forming the weather strip by an extrusion process using as base material the substance containing EPDM and other materials as shown in the composition in Table 3, it was vulcanized for 30 minutes at a temperature of 160° C. to produce a weather strip for an automobile. A test material was prepared by applying a coating composition of each of the embodiments shown below.

TABLE 3

| Composition | Mixing Proportion (parts by weight) |
|---|---|
| EPDM | 100 |
| carbon black | 70 |
| mineral oil | 35 |
| zinc oxide | 5 |
| stearic acid | 1 |
| vulcanizing accelerator | 2 |
| sulfur | 1.5 |

EMBODIMENT 12

The coating composition of Embodiment 6 was used.

EMBODIMENT 13

The coating composition of Embodiment 7 was used.

EMBODIMENT 14

The coating composition of Embodiment 8 was used.

EMBODIMENT 15

The coating composition of Embodiment 9 was used.

EMBODIMENT 16

The coating composition of Embodiment 10 was used.

EMBODIMENT 17

The coating composition of Embodiment 11 was used.

COMPARATIVE EXAMPLE 13

Instead of using 0.002 part of TCIA as a halogenating agent as in Embodiment 6, 25 parts of the same TCIA was used. A coating composition, whose other aspects are the same as those in Embodiment 6, was then prepared.

COMPARATIVE EXAMPLE 14

Instead of using 0.4 part of NBSI as a halogenating agent as in Embodiment 7, 30 parts of the same NBSI was used. A coating composition, whose other aspects are the same as those in Embodiment 7, was then prepared.

Next, an abrasion endurance test, using a glass edge abrasion testing machine which is an improved version of the Gakushin style abrasion testing machine, was performed on the test materials obtained in the Embodiments 12 to 17 and Comparative Examples 13 and 14 mentioned above, under the following conditions:

TESTING CONDITIONS

Abrasive: glass (thickness, 5 mm)
Cycle of Abrasive: 60 cycles/min
Stroke of Abrasive: 70 mm

TESTING METHOD

Normal State Abrasion: The base is mounted on the testing machine and the base is abraded and the amount of abrasion in the normal condition is tested.

TABLE 4

| Embodiment or Comparative Example | Abrasion Endurance Test (50,000 cycles) |
|---|---|
| Embodiment 12 | O |
| Embodiment 13 | O |
| Embodiment 14 | O |
| Embodiment 15 | O |
| Embodiment 16 | O |
| Embodiment 17 | O |
| Comparative Example 13 | Gelled |
| Comparative Example 14 | Gelled |

The symbol "O" in Table 4 a denotes a small amount of abrasion, that is, a strong endurance to abrasion.

As observed in Table 4, in Comparative Examples 13 and 14, the coating compositions themselves gelled, whereas in Embodiments 12 to 17, the coating composition was able to endure an abrasion of 50,000 cycles, thus showing that there is no problem with regard to abrasion. Also, the film of coating obtained exhibited good adhesion with the coated material.

Aside from the above tests, the weather strip processed with the coating compositions of Embodiments 12 to 17 was bent 180 degrees, and the pliability was observed.

The result of this was that the vulcanized polyolefin rubber used as base material for the weather strip retained its flexibility, and the weather strip exhibited good pliability. The properties of endurance to abrasion and pliability mentioned above are due to the properties of the high molecular-weight polyurethane that has a special structure.

Therefore, the coating compositions of Embodiments 12 to 17 are suitable for use as coating compositions for weather strips.

EMBODIMENTS 18 TO 23 AND COMPARATIVE EXAMPLES 15 AND 16

Next, embodiments of the second aspect of the invention used as an adhesive composition for electrostatic flocked materials are described and compared with comparative examples.

In the various examples below, it is either that electrostatic flocking was performed by applying the adhesive composition of each embodiment below on a base made of EPDM (Embodiments 18 to 20), or, a test material was made by applying the adhesive composition, then forming a pile, after electrostatic flocking (Embodiments 21 to 23). An abrasion endurance test with the conditions below was performed on this test material. The results of this test are shown in Table 5 to be mentioned later.

TEST CONDITIONS

Abrasive Wheel: H-22, load: 5 kg
Speed of Rotation of Abrasion: 60 rpm
Size of Test Material: 100 mm × 100 mm
Abrasion Cycle: 1000 cycles

EMBODIMENT 18

The composition mentioned in Embodiment 6 was used.

EMBODIMENT 19

The composition mentioned in Embodiment 7 was used.

EMBODIMENT 20

The composition mentioned in Embodiment 8 was used.

EMBODIMENT 21

The composition mentioned in Embodiment 9 was used.

EMBODIMENT 22

The composition mentioned in Embodiment 10 was used.

EMBODIMENT 23

The composition mentioned in Embodiment 11 was used.

COMPARATIVE EXAMPLE 15

The composition mentioned in Comparative Example 13 was used.

COMPARATIVE EXAMPLE 16

The composition mentioned in Comparative Example 14 was used.

TABLE 5

| Embodiment or Comparative Example | Abrasion Endurance Test (30,000 cycles) |
|---|---|
| Embodiment 18 | O |
| Embodiment 19 | O |
| Embodiment 20 | O |
| Embodiment 21 | O |
| Embodiment 22 | O |
| Embodiment 23 | O |
| Comparative Example 15 | X |
| Comparative Example 16 | X |

The symbol "O" used under the column Abrasion Endurance Test in Table 5 means that the amount of abrasion was small, that is, the result was good, while the symbol "X" denotes that the amount of abrasion was great and that the result was bad.

As observed in Table 5, for Comparative Examples 15 and 16, the result was bad for both in the 30,000 cycle abrasion endurance test, whereas for Embodiments 18 to 23, the material was able to endure 30,000 cycles of abrasion, thus showing that there is no problem with regard to abrasion. This is due to the high molecular-weight polyurethane that has a special structure. Also, the film of coating obtained exhibited excellent adhesion with the base material.

Therefore, the adhesive compositions in Embodiments 18 to 23 are suitable for use as an adhesive composition for electrostatic flocked materials.

EMBODIMENTS 24 TO 29 AND COMPARATIVE EXAMPLES 17 AND 18

Next, embodiments of the adhesive composition of the second aspect of the present invention as used in adhesive tapes is described.

The following substances were used as adhesive compositions:

EMBODIMENT 24

The adhesive composition was made by adding 0.002 part of t-BHC as a halogenating agent to 100 parts of the polyurethane described in Embodiment 6.

EMBODIMENT 25

A mixture of 60 parts of PPG (molecular weight about 1000), 22 parts of polyethylene butylene adipate (molecular weight 1000), 100 parts of MDI and 264 parts of trichloroethylene was made to undergo reaction for 3 hours in an atmospheric current of dry nitrogen at a temperature of 80° C.

Afterward, polyurethane was obtained by adding 24.8 parts of 1,6-HD and 170 parts of DMF and then letting the mixture undergo reaction for 20 minutes in an atmospheric current of nitrogen at a temperature of 80° C. Finally, an adhesive composition was made by adding 0.4 part of NBSI as a halogenating agent to 100 parts of this polyurethane.

EMBODIMENT 26

An adhesive composition was made by adding 20 parts of TCIA as a halogenating agent to 100 parts of the polyurethane described in Embodiment 8.

EMBODIMENT 27

An adhesive composition was made by adding 0.002 part of t-BHC as a halogenating agent to 100 parts of the polyurethane described in Embodiment 9.

EMBODIMENT 28

An adhesive composition was made by adding 0.4 part of NBSI as a halogenating agent to 100 parts of the polyurethane described in Embodiment 10.

EMBODIMENT 29

An adhesive composition was made by adding 20 parts of TCIA as a halogenating agent to 100 parts of the polyurethane described in Embodiment 11.

Next, the adhesive composition of each embodiment and comparative example mentioned above were used and the area of adhesion and tensile shear strength were measured.

A test material was made by using an 8-times magnification polyethylene foam as the base material for the two-surface adhesive tape. The two-surface adhesive tape was taped on one surface of the polyethylene foam, then glued to a solid coating steel plate. The other surface of the polyethylene foam was applied with an adhesive and then glued to a vinyl chloride resin plate. This test material was immersed in gasoline or wax remover, serving as a solvent, for one hour. Then, the area of adhesion and the tensile shear strength were measured. The test on the tensile shear strength was performed at a pulling speed of 30 mm/min. The results are shown in Table 6.

TABLE 6

| Embodiment or Comparative Example | Solvent | Adhesion Area (%) | Tensile Shear Strength (kg/cm$^2$) |
| --- | --- | --- | --- |
| Embodiment 24 | G | 89 | 7.5 |
| Embodiment 25 | G | 92 | 7.8 |
| Embodiment 26 | G | 92 | 8.0 |
| Embodiment 27 | W | 90 | 7.6 |
| Embodiment 28 | W | 91 | 7.6 |
| Embodiment 29 | W | 90 | 7.9 |
| Comparative Example 17 | G | 25 | 1.5 |
| Comparative Example 18 | W | 25 | 1.5 |

In Table 6, adhesive compositions were not used in Comparative Examples 17 and 18. In the column for solvent, "G" stands for gasoline and "W" stands for wax remover.

As observed in Table 6, for both Comparative Examples 17 and 18, the area of adhesion was 25%, and the tensile shear strength was 1.5 kg/cm$^2$, whereas for Embodiments 24 to 29, the area of adhesion was satisfactorily maintained in the range of 89 to 92%, while the tensile shear strength was within 7.5 to 8.0, showing a high strength. This is particularly due to the fact that the halogenating agent halogenates the adhesive composition itself as well as the polyethylene base of the adhesive tape, thus improving the mutual bonding forces.

Therefore, the adhesive compositions in Embodiments 24 to 29 are suitable for application in adhesive tapes used for mounting moldings onto car bodies, and in adhesive tapes used in chemical apparatus which are prone to being spilled with solvents.

As many apparently widely different embodiments of this invention may be made without departing from the spirit and scope thereof, it is to be understood that the invention is not limited to the specific embodiments thereof except as defined in the appended claims.

What is claimed is:

1. An adhesive composition comprising 100 parts by weight of a polyester-polyurethane having an isocyanate group (—NCO) and 0.002–20 parts by weight of a halogenating agent.

2. An adhesive composition, as set forth in claim 1, in which the halogenating agent is an alkyl hypohalide, a halogenated hypochlorite or a substance containing a -CONX-bond in a molecule.

3. An adhesive composition, as set forth in claim 1, in which the polyester polyurethane having an isocyanate group (—NCO) is obtained by using a chain extending agent and/or a solvent.

4. An adhesive composition, as set forth in claim 3, in which the chain extending agent is dihydric alcohol.

5. An adhesive composition comprising 0.002–20 parts by weight of a halogenating agent and 100 parts by weight of a polyurethane having an isocyanate group (—NCO) or a hydroxyl group (—OH) obtained by making a low molecular-weight diol undergo reaction in a product of the reaction of a mixture of polyester diol and polyether diol and a diisocyanate.

6. An adhesive composition, as set forth in claim 5, in which the product of the reaction between the mixture of polyester diol and polyether diol and the diisocyanate is obtained by making them undergo reaction, in which the mole ratio of the hydroxyl group (—OH) in the polyester diol-polyether diol mixture and the isocyanate group (—NCO) in the diisocyanate is 1:2–10.

* * * * *